(12) United States Patent
Kim et al.

(10) Patent No.: US 9,520,610 B2
(45) Date of Patent: Dec. 13, 2016

(54) METHOD OF MANUFACTURING 5-LAYER MEA HAVING IMPROVED ELECTRICAL CONDUCTIVITY

(75) Inventors: Young Soo Kim, Gyeonggi-do (KR); Ki Sub Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 416 days.

(21) Appl. No.: 12/001,004

(22) Filed: Dec. 7, 2007

(65) Prior Publication Data

US 2010/0279196 A1 Nov. 4, 2010

(30) Foreign Application Priority Data

May 30, 2007 (KR) .................. 10-2007-0052573

(51) Int. Cl.
*H01M 8/10* (2006.01)
*H01M 4/88* (2006.01)

(52) U.S. Cl.
CPC .......... *H01M 8/1004* (2013.01); *H01M 4/881* (2013.01); *H01M 2008/1095* (2013.01); *Y02E 60/522* (2013.01); *Y02P 70/56* (2015.11)

(58) Field of Classification Search
CPC ....................................................... H01M 8/10
USPC ....................................................... 429/483
See application file for complete search history.

(56) References Cited

U.S. PATENT DOCUMENTS

| | | | |
|---|---|---|---|
| 6,350,539 B1 * | 2/2002 | Wood et al. | 429/450 |
| 6,391,487 B1 * | 5/2002 | Totsuka | 429/480 |
| 2003/0121603 A1 * | 7/2003 | Oh et al. | 156/276 |
| 2003/0157397 A1 | 8/2003 | Barton et al. | |
| 2005/0104047 A1 * | 5/2005 | Suzuki et al. | 252/511 |
| 2005/0170237 A1 * | 8/2005 | Nakagawa et al. | 429/44 |
| 2005/0238932 A1 * | 10/2005 | Koyama et al. | 429/13 |
| 2006/0014073 A1 * | 1/2006 | Kim | H01M 4/8605 429/480 |
| 2006/0093892 A1 * | 5/2006 | Min et al. | 429/40 |
| 2006/0257641 A1 * | 11/2006 | Cho et al. | 428/307.3 |
| 2006/0264321 A1 * | 11/2006 | Fernandez et al. | 502/182 |
| 2007/0015042 A1 * | 1/2007 | Ji et al. | 429/44 |

FOREIGN PATENT DOCUMENTS

| | | |
|---|---|---|
| CN | 1716665 A | 1/2006 |
| JP | 2004-214045 A | 7/2004 |
| JP | 2006-001630 A | 1/2006 |
| JP | 2006-179292 | 7/2006 |
| WO | WO-02/073721 | 9/2002 |

OTHER PUBLICATIONS

CN 1716665 MT.*

* cited by examiner

*Primary Examiner* — Patrick Ryan
*Assistant Examiner* — Alex Usyatinsky
(74) *Attorney, Agent, or Firm* — Mintz Levin Cohn Ferris Glovsky and Popeo, P.C.; Peter F. Corless

(57) ABSTRACT

The present invention provides a method of manufacturing a 5-layer MEA having an improved electrical conductivity capable of reducing electrical contact resistance between a catalyst layer and a micro-porous layer (MPL) by forming a new electrical conductive layer between the catalyst layer of a 3-layer MEA and the MPL.

7 Claims, 6 Drawing Sheets

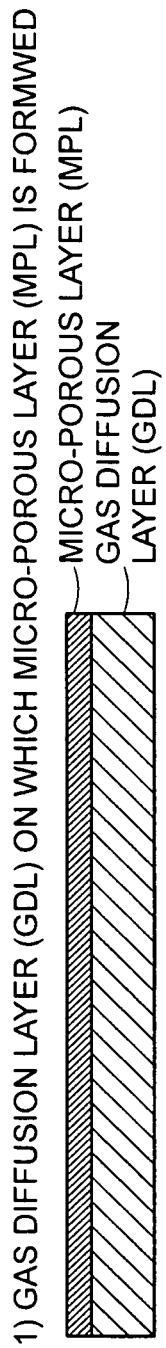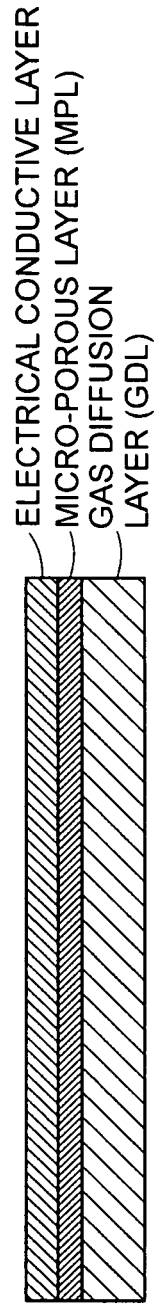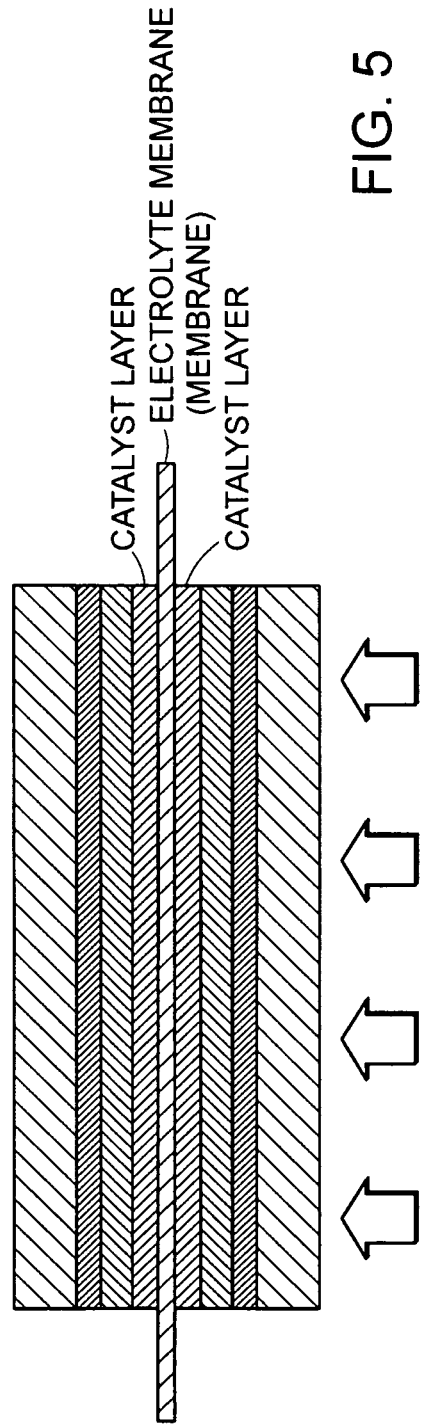

FIG. 5

1) GAS DIFFUSION LAYER (GDL) ON WHICH MICRO-POROUS LAYER (MPL) IS FORMWED
  MICRO-POROUS LAYER (MPL)
  GAS DIFFUSION LAYER (GDL)

2) COATING ELECTRICAL CONDUCTIVE LAYER ON MICRO-POROUS LAYER (MPL)
  ELECTRICAL CONDUCTIVE LAYER
  MICRO-POROUS LAYER (MPL)
  GAS DIFFUSION LAYER (GDL)

3) THERMALLY COMPRESSING ELECTRICAL CONDUCTIVE LAYER-COATED GAS DIFFUSION LAYERS BEING IN CONTACT WITH BOTH SIDES OF 3-LAYER MEA
  CATALYST LAYER
  ELECTROLYTE MEMBRANE (MEMBRANE)
  CATALYST LAYER

METHOD OF MANUFACTURING 5-LAYER MEA HAVING IMPROVED ELECTRICAL CONDUCTIVITY

CROSS-REFERENCE TO RELATED APPLICATION

This application claims under 35 U.S.C. §119(a) on Korean Patent Application No. 10-2007-0052573, filed on May 30, 2007, the entire contents of which are incorporated herein by reference.

BACKGROUND (a) Technical Field

The present invention relates to a method of manufacturing a 5-layer MEA having an improved electrical conductivity, which can reduce electrical contact resistance between a catalyst layer and a micro-porous layer (MPL) therein.

(b) Background Art

Extensive research aimed at using a polymer electrolyte membrane fuel cell (PEMFC) as a power source of a vehicle or a stationary power generator having a capacity of 200 kW or less has continued to progress due to its advantages such as a high output density, a high response rate, a simplified system, and the like.

In the PEMFC, a membrane-electrode assembly (MEA) is positioned at the most inner portion, in which an anode and a cathode are positioned on both sides of an electrolyte membrane.

That is, as shown in FIG. 1, catalyst layers 3, i.e., an anode and a cathode are formed by uniformly coating a desired amount of catalyst onto the surface of a polymer electrolyte membrane (PEM) 4. Gas diffusion layers (GDLs) 2 are positioned at the outside of the catalyst layers 3. Separators 1 each having a flow field for supplying fuel and exhausting water produced by a reaction are positioned at the outside of the GDLs 2.

In general, a unit cell of the PEMFC comprises one PEM, two GDLs, and two separators, and a stack cell with a desired scale can be formed by stacking the unit cells.

Referring to FIG. 2, which is a schematic diagram illustrating the transfer of reactants in the MEA having the above-described configuration, an oxidation reaction of hydrogen takes place at the anode of the fuel cell to produce hydrogen ions and electrons. The thus produced hydrogen ions and electrons are transferred to the cathode through the polymer electrolyte membrane and a conducting wire, respectively.

Simultaneously, a reduction reaction of oxygen occurs at the cathode receiving the hydrogen ions and the electrons to produce water. At this time, electrical energy is generated by the flow of the electrons through the conducting wire and by the flow of the protons through the polymer electrolyte membrane.

Conventionally, the above-described MEA is prepared by either a catalyst-coated-on-GDL (CCG) process or a catalyst-coated-on-membrane (CCM) process. In the CCG process, catalyst is coated on gas diffusion layers (GDLs) and then the catalyst-coated GDLs are combined with a polymer electrolyte membrane, producing a 5-layer MEA. In the CCM process, catalyst is coated on a polymer electrolyte membrane, producing a 3-layer MEA.

The CCG process is widely used in a laboratory scale since the manufacturing process is simple and easy. However, it is difficult to apply the CCG process in industrial fields due to its serious shortcomings in that the catalyst layer can be coated onto the GDLs only by a spray coating process and the spray coating process involves a relatively high rate of catalyst loss, thus deteriorating the overall manufacturing efficiency.

On the other hand, as a CCM process, a decal process is generally applicable to industrial fields. In the decal process, catalyst slurry is applied onto a decal (release) paper, the applied catalyst slurry is dried, followed by thermo-compression onto to polymer electrolyte membrane (refer to FIG. 3).

The decal process has an advantage in that there is hardly any resistance (proton resistance) between the electrolyte membrane and the catalyst layer since it is possible to form the catalyst layer directly onto the polymer electrolyte membrane. Nonetheless, it has a disadvantage in that contact resistance is inevitably caused in the process of stacking the gas diffusion layers (GDLs) onto the catalyst layers.

In general, the GDL includes a micro-porous layer (MPL) formed on a surface thereof to be in contact with the catalyst layer. The MPL functions to smoothly exhaust water produced by electrochemical reaction and further to facilitate physical contact between the catalyst layers having pores with diameters of several nanometers and the GDLs having pores with diameters of several microns.

The MPL includes carbon particles and a binder. The carbon particles are used to ensure electrical conductivity. The binder are used to bind carbon particles (e.g., binding between carbon particles and binding between carbon particles and the GDL) and provide waterproof performance. Teflon resin is mainly used as the binder and it can smoothly exhaust water due to its hydrophobic characteristics.

An example of a layer configuration of the conventional MEA is shown in FIG. 4. In the CCG process, as described above, the catalyst layer is coated directly on the MPL and dried. Thus, no boundary between the catalyst layer and the MPL is created and no electrical contact resistance is caused. By contrast, in the CCM process, i.e., the decal process, since the catalyst layer is in contact with the MPL by a simple connecting pressure, electrical contact resistance is caused on the boundary surface thereof.

In order to solve the contact resistance problem, various types of MPLs have been developed and commercialized. However, maximum output performance is hard to be achieved because it is difficult to accurately combine the configurations of the catalyst layer and the MPL. Moreover, providing an optimum combination thereof requires considerable amount of time and resources. Furthermore, after a new catalyst layer is developed, a new MPL suitable for the new catalyst layer still must be developed.

For example, a thermo-compression process may be used in order to remove the contact resistance between the catalyst layer and the MPL. However, Nafion used as the binder of the catalyst layer has a glass transition temperature (Tg) of about 100° C. to about 130° C. and a melting point (Tm) of about 200° C. to about 230° C., and Teflon resin used as the binder of the MPL has a Tg as high as about 340° C. Accordingly, it is impossible to connect the two layers only by the simple thermo-compression process.

Moreover, it is undesirable to use an adhesive agent since it may affect the chemical stability and cause additional contact resistance.

Accordingly, there is a need for a new manufacturing method which can overcome the above-described problems associated with prior art.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to provide a method of manufacturing a 5-layer MEA having an improved electrical conductivity, which is capable of reducing electrical contact resistance between a catalyst layer and a micro-porous layer (MPL).

In one aspect, the present invention provides a method of manufacturing a 5-layer MEA having an improved electrical conductivity, the method comprising: providing a 3-layer MEA having an electrolyte membrane and catalyst layers formed on both sides of the electrolyte membrane; forming a micro-porous layer on a surface of a gas diffusion layer to be in contact with the catalyst layer; coating an electrical conductive layer on the micro-porous layer; bringing the gas diffusion layer having the micro-porous layer coated with the electrical conductive layer into contact with each of the catalyst layers of the 3-layer MEA; and thermally compressing contacted the layers so as to connect each of the catalyst layers of the 3-layer MEA and the electrical conductive layer.

In a preferred embodiment, the electrical conductive layer is formed in a slurry by mixing a Nafion solution as a binder and carbon particles (carbon black) in isopropanol alcohol (IPA) and distilled water (DI water). The slurry is coated on the micro-porous layer by an appropriate coating method and then dried.

Preferably, the coating method is one selected from the group consisting of spray coating, bar coating, and slot die coating.

Suitably, both the catalyst layers and the electrical conductive layer include Nafion as a binder. The micro-porous layer includes Teflon as a binder.

Also suitably, each of the catalyst layers, the electrical conductive layer and the micro-porous layer includes carbon as an electrical conductive material.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

BRIEF DESCRIPTION OF THE DRAWINGS

FIG. 5 is a schematic diagram illustrating a method of manufacturing a 5-layer MEA having an improved electric conductivity in accordance with the present invention.

Figure 1:
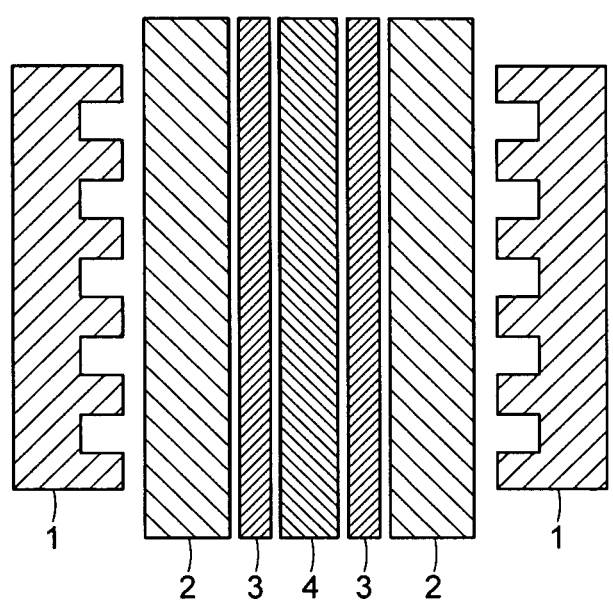
FIG. 1 is a diagram illustrating a general configuration of a unit cell of a fuel cell.
Figure 2:
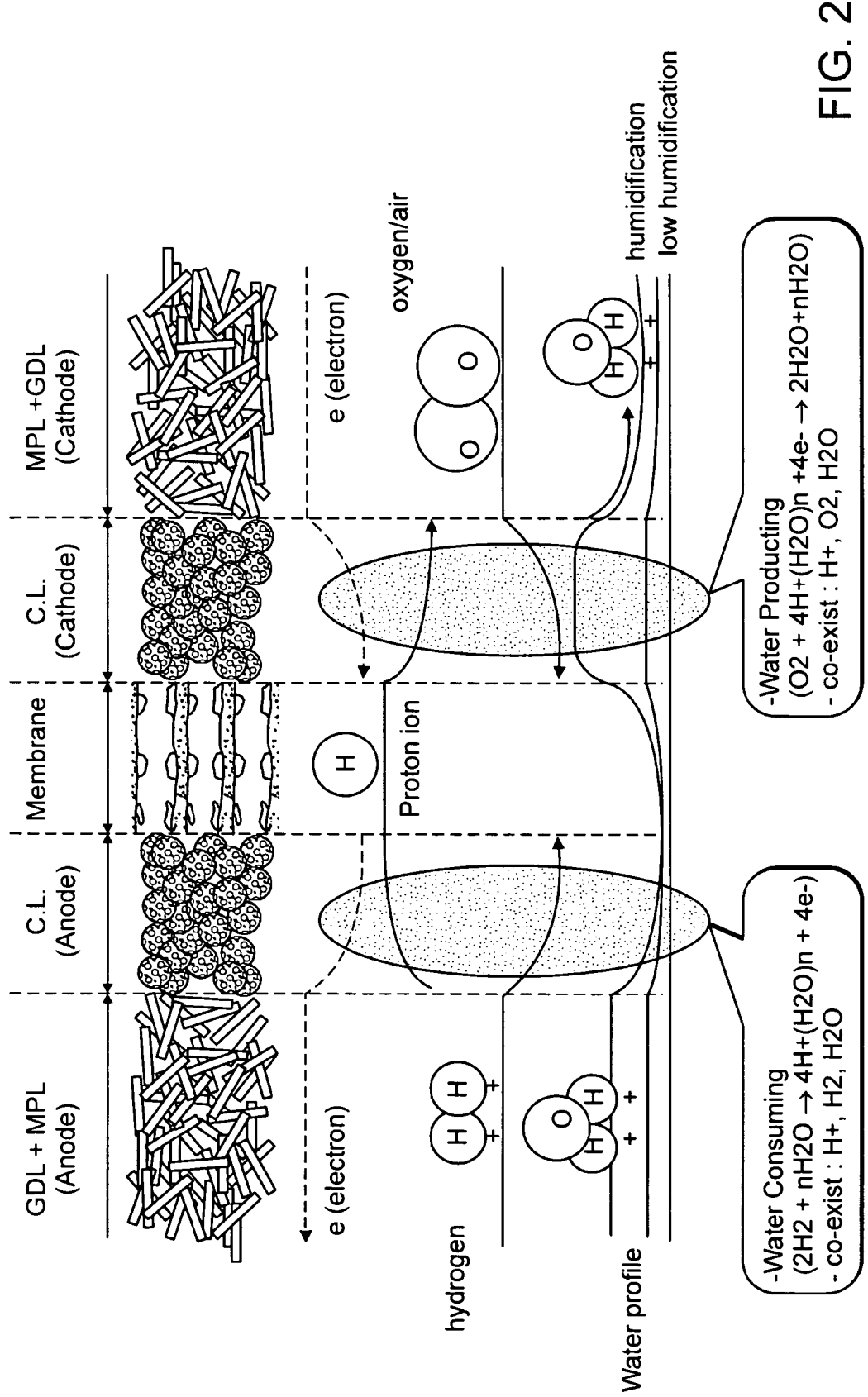
FIG. 2 is a schematic diagram illustrating the transfer of reactants in an MEA.
Figure 3:
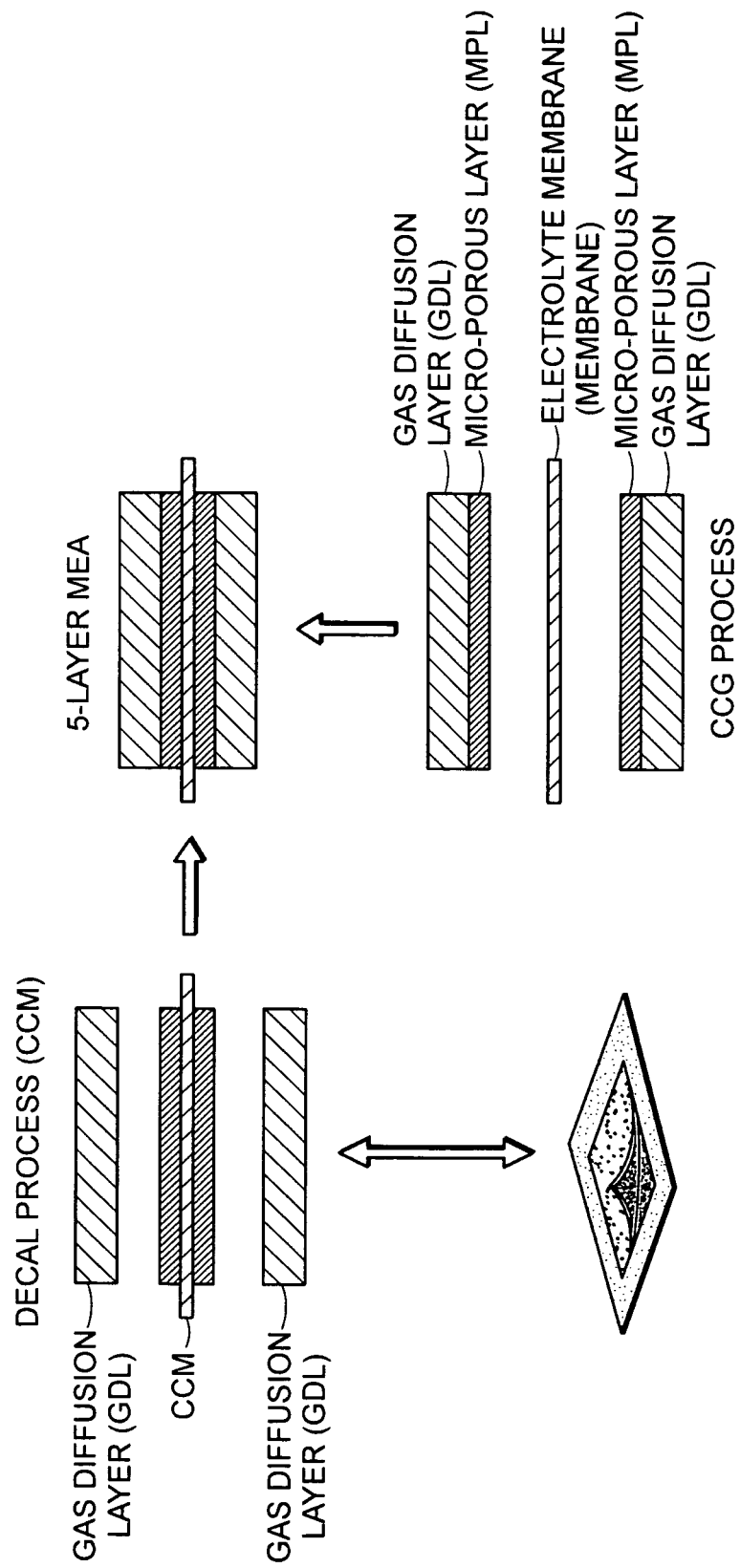
FIG. 3 is a schematic diagram illustrating a conventional method of manufacturing a MEA.
Figure 4:
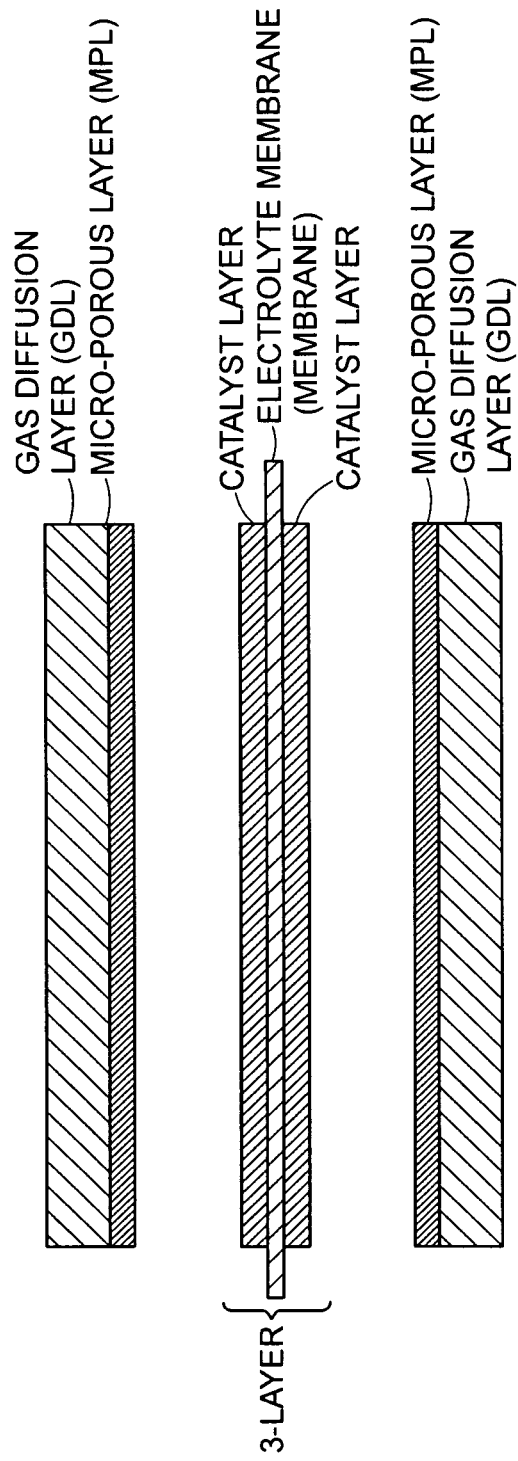
FIG. 4 is a schematic diagram illustrating a configuration of a conventional MEA.

Reference numerals set forth in the Drawings includes reference to the following elements as further discussed below:

| 1: separator | 2: gas diffusion layer |
| 3: catalyst layer | 4: electrolyte membrane |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

The present invention provides a method of manufacturing a 5-layer MEA having an improved electrical conductivity by forming a new electrical conductive layer between the catalyst layer of a 3-layer MEA and the MPL formed on a gas diffusion layer (GDL).

As shown in FIG. 5, according to a preferred embodiment of the present invention, a 5-layer MEA having an improved electrical conductivity of the present invention is manufactured by the process comprising: preparing a 3-layer MEA, in which catalyst layers are formed on both sides of an electrolyte membrane; forming gas diffusion layer (GDL) having a micro-porous layer (MPL); coating electrical conductive layers on the MPLs of the GDLs; bringing the gas diffusion layers having the micro-porous layer coated with the electrical conductive layer into contact with both sides of the 3-layer MEA; and thermally compressing the layers being in contact with one another so as to connect the catalyst layers of the 3-layer MEA and the electrical conductive layers.

That is, the electrical conductive layer is formed between the catalyst layer and the MPL by coating the electrical conductive layer in the form of slurry on the MPL using a coating method selected from the group consisting of spray coating, bar coating, and slot die coating, and then thermally compressing the coated electrical conductive layer and the catalyst layer the 3-layer MEA.

More particularly, the electrical conductive layer is formed in such a manner that a Nafion solution (as a binder) and carbon particles (e.g., carbon black) are mixed in appropriate amounts of isopropanol alcohol (IPA) and deionized water (DI water) to be in the form of slurry, and the slurry is coated on the MPL by a coating method as described above, and then dried.

In this case, the 3-layer MEA can be formed by a known process, e.g., a CCG process or a decal process.

Subsequently, the electrical conductive layer coated on the MPL of the GDL is placed to be in contact with the 3-layer MEA and then thermally compressed with predetermined pressure and temperature. Like the electrical conductive layer, the catalyst layer has Nafion as the binder. As a result, it is possible to facilitate the connecting process of the two layers during the thermo-compression process.

That is, the electrical conductive layer including Nafion as the binder thereof and the MPL including Teflon as the binder thereof are first connected to each other. The electrical conductive layer and the catalyst layer, both of which include Nafion as the binders, can be readily connected to each other during the thermo-compression process.

Meanwhile, carbon is used in the catalyst layer, the electrical conductive layer and the MPL as an electrical conductive material.

As discussed above, while the 5-layer MEA prepared by prior art methods shows electrical contact resistance on the boundary surface between the catalyst layer and the MPL, the 5-layer MEA prepared by present invention shows reduced electrical contact resistance between the catalyst layer and the MPL.

Next, the present invention will be described in more detail with reference to the following example, but the present invention should not be limited to the example.

EXAMPLE

1) Preparing Slurry for an Electrical Conductive Layer

A 5 wt % Nafion solution and a commercially available carbon black (Vulcan XC-72, Cabot Corporation) were mixed in a solvent mixture of isopropanol alcohol (IPA) and water by applying ultrasonic waves. Nafion and the carbon black were mixed in a weight ratio of 1:1.

2) Forming an Electrical Conductive Layer

The thus-obtained slurry was coated at 0.3 mg carbon/cm$^2$ on the micro-porous layer (MPL) of a commercially available gas diffusion layer (GDL) (SGL Carbon Group, Sigracet GDL 10BB) using a spray coater. Subsequently, the thus-coated electrical conductive layer was dried at 80° C. in an oven for 30 minutes.

3) Preparing a 3-Layer MEA

A 5 wt % Nafion solution and a commercially available platinum catalyst (55% Pt/C, Columbia Chemical Company) were mixed in a solvent mixture of isopropanol alcohol (IPA) and water by applying ultrasonic waves to form slurry. The thus-formed slurry was coated at 0.4 mg Pt/cm$^2$ with respect to the platinum catalyst on a release paper using a laboratory bar coater and then dried.

The thus-coated electrode was cut into 5 cm in length and width and was placed to be in contact with both sides of a Flemion® membrane (30 um in thickness) and then connected to one another by a hot press process at 125° C. for 5 minutes.

4) Connecting the Electrical Conductive Layer with the 3-Layer MEA

The electrical conductive layers coated on the MPL of the GDL were stacked to be in contact with an anode and a cathode of the 3-layer MEA, i.e., the catalyst layers of the 3-layer MEA, and then connected to one another by a hot press process at 125° C. for 5 minutes.

EXPERIMENTAL EXAMPLE

A performance test was carried out for the 5-layer MEA manufactured in the Example of the present invention to examine its current-voltage characteristics.

The test was carried out in the presence of 1.5 equivalent of hydrogen and 2.0 equivalent of air with the temperature of 70° C. at anode, a cell, and a cathode and under the atmospheric pressure (0 psig). As a Comparative Example, the test was carried out for the 3-layer MEA, which was manufactured in the same manner as the Example 3), without electrical conductive layer.

Figure 6:
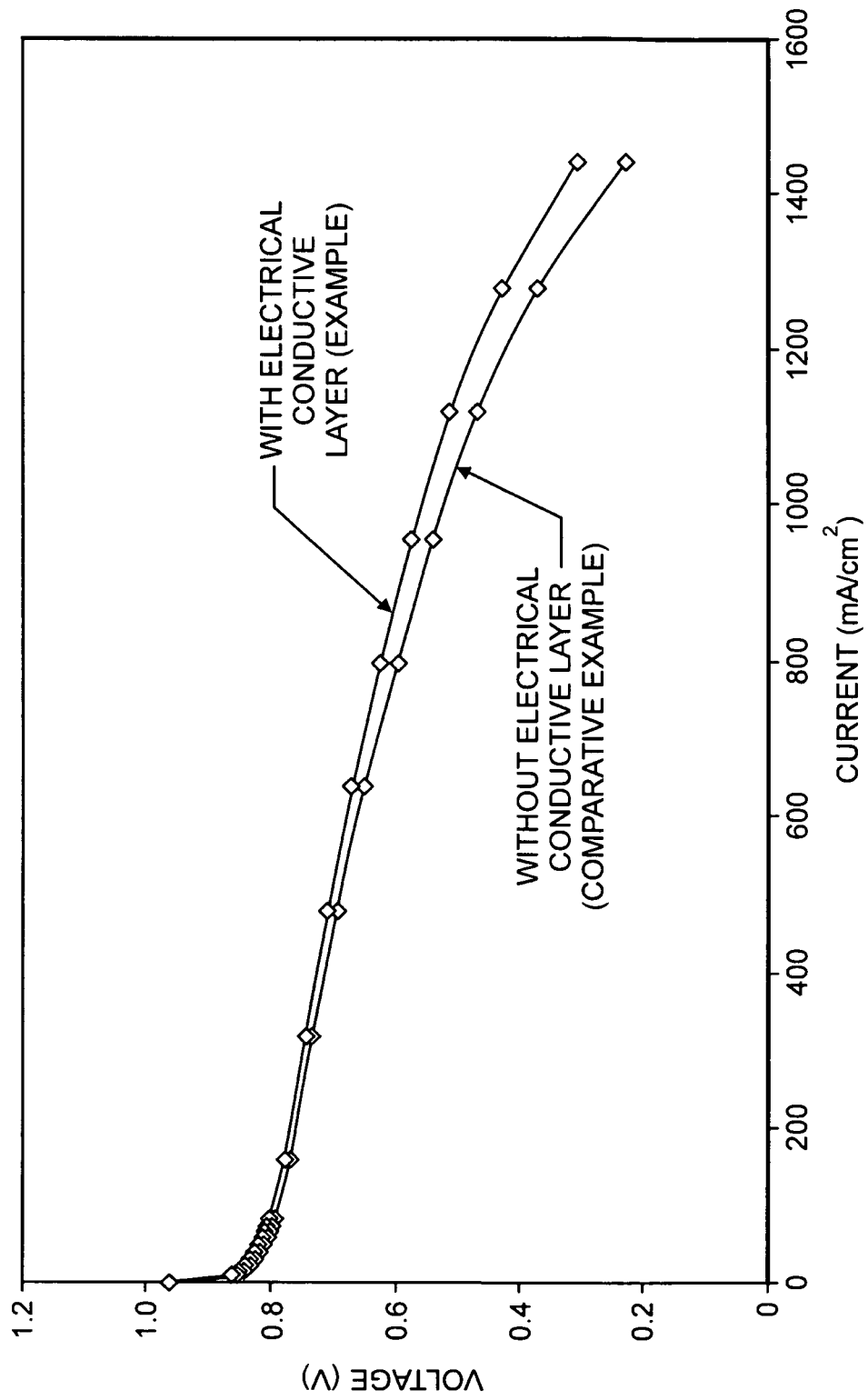
FIG. 6 is a graph showing test results of current-voltage characteristics between a 5-layer MEA having an electric conductive layer in accordance with the present invention and a prior art 5-layer MEA without an electric conductive layer.

As a result of the performance test, as shown in FIG. 6, the 5-layer MEA of the present invention shows an increased output performance.

As described above, according to a method of manufacturing a 5-layer MEA having an improved electrical conductivity, it is possible to reduce electrical contact resistance between a catalyst layer and a micro-porous layer (MPL) by forming a new electrical conductive layer between the catalyst layer of a 3-layer MEA and the MPL.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a 5-layer MEA having an improved electrical conductivity, the method comprising:
   providing a 3-layer MEA having an electrolyte membrane and catalyst layers formed on both sides of the electrolyte membrane, wherein the 3-layer MEA is formed by steps comprising mixing a Nafion solution and a platinum catalyst in a solvent mixture to form a slurry, coating the formed slurry on a release paper, drying the slurry coated on the release paper, cutting the thus-coated electrode into a predetermined size and placing the cut electrode in contact with both sides of a membrane and then connected to one another by a hot press process;
   forming a micro-porous layer on a surface of a gas diffusion layer, wherein the micro-porous layer includes a Teflon as a binder;
   coating an electrical conductive layer on the micro-porous layer, wherein the electrical conductive layer is formed in a slurry by mixing a Nafion solution as a binder and carbon particles (carbon black) in isopropanol alcohol (IPA) and distilled water (DI water) and the electrical conductive layer including the Nafion as the binder and the micro-porous layer including the Teflon as the binder are first connected to each other;
   bringing the gas diffusion layer having the micro-porous layer coated with the electrical conductive layer into contact with each of the catalyst layers of the 3-layer MEA such that the electrical conductive layer is disposed between the catalyst layer of the 3-layer MEA and the micro-porous layer formed on the surface of the gas diffusion layer; and
   thermally compressing the contacted layers so as to connect each of the catalyst layers of the 3-layer MEA and the electrical conductive layer, wherein both the electrical conductive layer and the catalyst layer include the Nafion as the binders and are connected to each other as being thermally compressed.

2. The method of claim 1, wherein the coating of the electrical conductive layer on the micro-porous layer is conducted by a method selected from the group consisting of spray coating, bar coating, and slot die coating.

3. The method of claim 1, wherein each of the catalyst layers, the electrical conductive layer and the micro-porous layer includes carbon as an electrical conductive material.

4. The method of claim 1, wherein the slurry for the electrical conductive layer contains the Nafion and the carbon black mixed in a weight ratio of 1:1.

5. The method of claim 1, wherein the slurry for the electrical conductive layer is coated at 0.3 mg carbon/cm$^2$ on the micro-porous layer.

6. The method of claim 1, wherein the electrical conductive layer was dried at 80° C. in an oven for 30 minutes.

7. The method of claim 1, wherein the electrical conductive layers coated on the micro-porous layer of the gas diffusion layer are connected to each of the catalyst layers of the 3-layer MEA by a hot press process at 125° C. for 5 minutes.

* * * * *